United States Patent [19]
Ball et al.

[11] Patent Number: 5,394,445
[45] Date of Patent: Feb. 28, 1995

[54] TELEPHONE CALL SCREENING AND ANSWERING DEVICE

[76] Inventors: Randel H. Ball, 1128-D Heritage, Waldorf, Md. 20602; Stephen E. Hall, 8508 Trumps Hill Rd., Upper Marlboro, Md. 20772

[21] Appl. No.: 82,759

[22] Filed: Jun. 25, 1993

[51] Int. Cl.[6] .......................................... H04M 11/00
[52] U.S. Cl. ...................................... 379/67; 379/130; 379/140; 379/142
[58] Field of Search ................. 379/67, 140, 142, 130, 379/131

[56] References Cited

U.S. PATENT DOCUMENTS

| | | | |
|---|---|---|---|
| 4,200,994 | 4/1983 | Sasano | 379/142 |
| 4,406,925 | 9/1983 | Jordan | 379/140 |
| 4,602,129 | 7/1986 | Matthews | 179/18 B |
| 4,894,861 | 1/1990 | Fujioka | 379/374 |
| 4,924,491 | 5/1990 | Compton | 379/49 |
| 4,924,496 | 5/1990 | Figa | 379/142 |
| 4,926,470 | 5/1990 | Sanford | 379/188 |
| 4,942,598 | 7/1990 | Davis | 379/142 |
| 4,985,913 | 1/1991 | Shalom | 379/142 |
| 5,146,490 | 9/1992 | Beckman | 379/140 |
| 5,193,110 | 5/1993 | Jones | 379/100 |
| 5,220,599 | 6/1993 | Sasano | 379/67 |
| 5,241,586 | 8/1993 | Wilson | 379/142 |
| 5,255,183 | 10/1993 | Katz | 379/142 |
| 5,276,731 | 1/1994 | Arbel | 379/142 |
| 5,278,894 | 1/1994 | Shaw | 379/142 |

OTHER PUBLICATIONS

Tandy Corp., Radio Shack Catalog, 1993, pp. 10 & 12.

*Primary Examiner*—James L. Dwyer
*Assistant Examiner*—Michael N. Lau

[57] ABSTRACT

For receiving calls in a network delivering calling numbers to called lines. A device and process whereby a plurality of delivered calling number and associated announcement message pairs is automatically acquired and accumulated upon receipt of calls from unrecognized calling numbers. Upon receipt of calls from calling numbers for which matching calling number and announcement message pairs have been previously acquired in this manner, the matching announcements are automatically played to aid the user in identifying calling parties before answering calls. Calling numbers and spoken announcements thus acquired are additionally used to audibly describe previously received calls both locally and remotely, and to assist with the preparation and delivery of outgoing messages and with returning calls.

18 Claims, 2 Drawing Sheets

TELEPHONE CALL SCREENING AND ANSWERING DEVICE

BACKGROUND—FIELD OF INVENTION

This invention relates to telephone call screening and answering devices, specifically to devices which are capable of receiving, displaying, announcing, recording, and processing Calling Number Delivery (CND) information.

BACKGROUND—DESCRIPTION OF PRIOR ART

The evolution of stored-program-controlled switching systems in the public telephone network has resulted in the wide availability of Calling Number Delivery (CND) service (also known as "Caller ID" service in some areas). This service delivers the identity of the calling line to the called line in digital form. Delivery of the Calling Number (CN) takes place during the silent interval following the first ring on conventional analog subscriber loops. The procedures for delivery are described, for example, in Bellcore documents TA-NWT-000030 and TR-TSY-000031. Thus the identification of the calling line can be known by the called party without answering the call, allowing the selective acceptance of certain calls while disregarding others, or allowing calls to be taken by an answering device. Devices are widely available to display, record, and redisplay recorded CND information. This information typically includes the time and date of the call, and the calling line's area code and directory number. In addition to being useful for screening calls, these devices are useful as logs, for example to check for calls that may have been missed while away from the telephone, especially if messages were not, or could not be taken. A disadvantage of these devices is the requirement to screen calls visually using a display, which may be inconvenient or impractical. As one example, consider the case of an incoming call while a family is dining together. One family member, often not the intended recipient of the call, interrupts his or her meal to leave the table and read the calling number on the display. If that person does not recognize the calling number, he or she may announce it to the other family members, who collectively may or may not recognize the number. As a second example, consider visually or otherwise handicapped persons who would like to enjoy the benefits of CND, but cannot benefit from a display arrangement.

R. Figa et al describe in U.S. Pat. No. 4,924,496 (1990) an improved display device with which the user preregisters pairs of calling numbers and additional identifying textual information using a keyboard. Upon receipt of a call, the delivered calling number is compared to the previously registered numbers, and if a match is found, the paired identifying text string is displayed. This improvement partially solves the problems of the first example given, in that the calling party is much more likely to be identified from the display of an identifying name or other additional information, rather than just the telephone number of the calling line. However, it does not address the need to visually examine the display, and requires manual preregistration of calling numbers and identifying text strings.

A second improved call screening device is described by M. Fujioka in U.S. Pat. No. 4,894,861 (1990) with which the user similarly preregisters pairs of calling numbers and additional identifying textual information using a keyboard. However, in place of, or in addition to, displaying the additional identifying textual information upon reception of a matching calling number, Fujioka's device employs "speech generating means . . . for providing an audible indication of the identifying information." However, this improved device also requires the user to manually preregister, using a keyboard device, both the CN data (directory number) and a textual representation of the identifying announcement information. An additional deficiency of this device is its use of a synthetic speech generator to provide the audible announcement function, thus constraining the qualities of announcements to the characteristics of text-to-speech implementations with regard to pronunciation of proper names, language, alphabet, emphasis, intonation, and so forth.

A further deficiency of the prior art is the absence of means for remotely obtaining information received and recorded by CND presentation devices. Yet another deficiency of the prior art is the absence of means for correlating CND information received and recorded by CND display devices with incoming messages recorded by telephone answering devices. For example, to facilitate returning a call or preparing an outgoing reply message to a call, a user may wish to associate an incoming message in which a caller either fails to leave his or her number, or in which the number is unintelligible, with a recorded CND display entry containing an accurate representation of the desired number from the same call. Even if the association can be obtained locally (for example if both the CND display and the telephone answering devices include matching time stamp information), this association cannot be achieved remotely using prior art devices. Further, the prior art in telephone call screening and answering devices does not provide means for the user to discover, both locally and remotely, whether, when, or how many calls have been received from, or messages have been taken from or delivered to particular CNs. A further deficiency of the prior art relates to the management of incoming calls in the case that an answering device's message storage has been exhausted. In such a case, the user must assume the possibility that messages that would otherwise have been left by callers have been lost. Finally, the prior art in telephone call screening and answering devices does not provide a uniform user interface for both local and remote operation. Typically, these devices include a number of mechanical controls and indicators that are only accessible locally. Examples include security code, recording speed, incoming message length limit, and number of rings before answering calls.

OBJECTS AND ADVANTAGES

Accordingly, several objects and advantages of our invention, an Electronic Telephone Receptionist (ETR), are:

(a) To screen calls by automatically selecting and playing one of a plurality of user-recorded announcement messages based on received Calling Number Delivery information. This eliminates any need to visually examine a display device or answer a phone to receive the announcement, eliminates the need to key in the identifying announcement text, and avoids the limitations of text-to-speech announcement implementations.

(b) To automatically prompt the user to record announcement messages at intuitively appropriate times; specifically, following calls for which no announcements are presently available, and following playback of incoming messages left by callers for whom no announcement messages are presently available.

(c) To provide for the recording of such announcements using a standard telephone, both locally and remotely.

(d) To use CND information delivered with calls to establish the files which identify user-recorded announcements, thus eliminating the inconvenience of manually keying the calling number, and reducing the likelihood of error.

(e) To use CND information delivered with calls to address and deliver outgoing messages recorded by the user for delivery to specific calling numbers, and to advise the user of delivery of these outgoing messages.

(f) To provide an alternate means of selecting and delivering these outgoing messages, using dual tone multiple frequency signaling, in the case where the addressee is calling from a line other than the expected delivery line, or where more secure delivery is desirable.

(g) To use CND information delivered with calls and recorded with incoming messages to assist the user in returning calls by automatically dialing the callers' numbers.

(h) To maintain a log of each incoming call, in which is recorded;
 the received CND information,
 the time and date of the call (whether or not it was received as part of the CND information),
 the disposition of the call (not answered, answered manually, or answered automatically),
 an indication of whether outgoing message(s) were delivered,
 any incoming message left by the caller, or, if no message storage was available, an indication of whether the caller wished to have his call returned, and if so, to what number.

(i) To audibly present, both locally and remotely, the information maintained in said log of incoming calls, and to play back the user-recorded announcement messages associated with the CND information as an aid to describing the calls during said presentation. In this manner, incoming messages and received CND information are automatically correlated.

(j) To provide for the selective erasure or retention of incoming messages on a message-by-message basis.

(k) To maintain a plurality of user-recorded reminder messages (or "memos"), each of which may optionally be associated with a specific expiration date and time.

(l) To signal the user upon the expiration of any such reminder message ("memo"), and to play back such user-recorded reminder messages automatically upon their expiration or at any other time that the user may request.

(m) To maintain an alarm clock to alert the user at a specifiable time, and to automatically play back any pending reminder messages ("memos") upon acknowledgement of the alarm by the user.

Further objects and advantages are to provide a device which facilitates the consolidation of tasks associated with telephonic messaging, including returning calls, dictating replies, or dictating memos, while reviewing incoming calls. Still further objects and advantages of our invention will become apparent from a consideration of the drawings and ensuing descriptions.

REFERENCE NUMERALS IN DRAWINGS

4A Electronic Telephone Receptionist (first embodiment)
4B Electronic Telephone Receptionist (second embodiment)
6 Telephone Network Central Office Facility
8 Telephone Set
10 Modular Telephone Jack
12 Modular Line Jack
14 Phone Control Relay
16 Line Control Relay
18 Local Loop Power Generator
20A Audio Amplifier with Volume Control (Duplex)
20B Audio Amplifier with Volume Control (Simplex)
22 Speaker
24 Power Supply with Battery Backup Capability
26 Loop State Detector
28 Ringing Voltage Detector
30 Calling Number Demodulator
32 Dual Tone Multiple Frequency (DTMF) Generator and Detector
34 Voice Frequency Filters, Encoder, and Decoder (Codec)
36 Loop Termination
38 Microprocessor
40 Program Storage Memory
42 Voice Storage Memory
44 Data Storage Memory
46 Calendar and Clock
48 Light Emitting Diode (LED) Indicator
50 Microprocessor Address, Control, and Data Bus
52 Record/Playback Switch

DETAILED DESCRIPTION OF THE DRAWINGS

Figure 1:
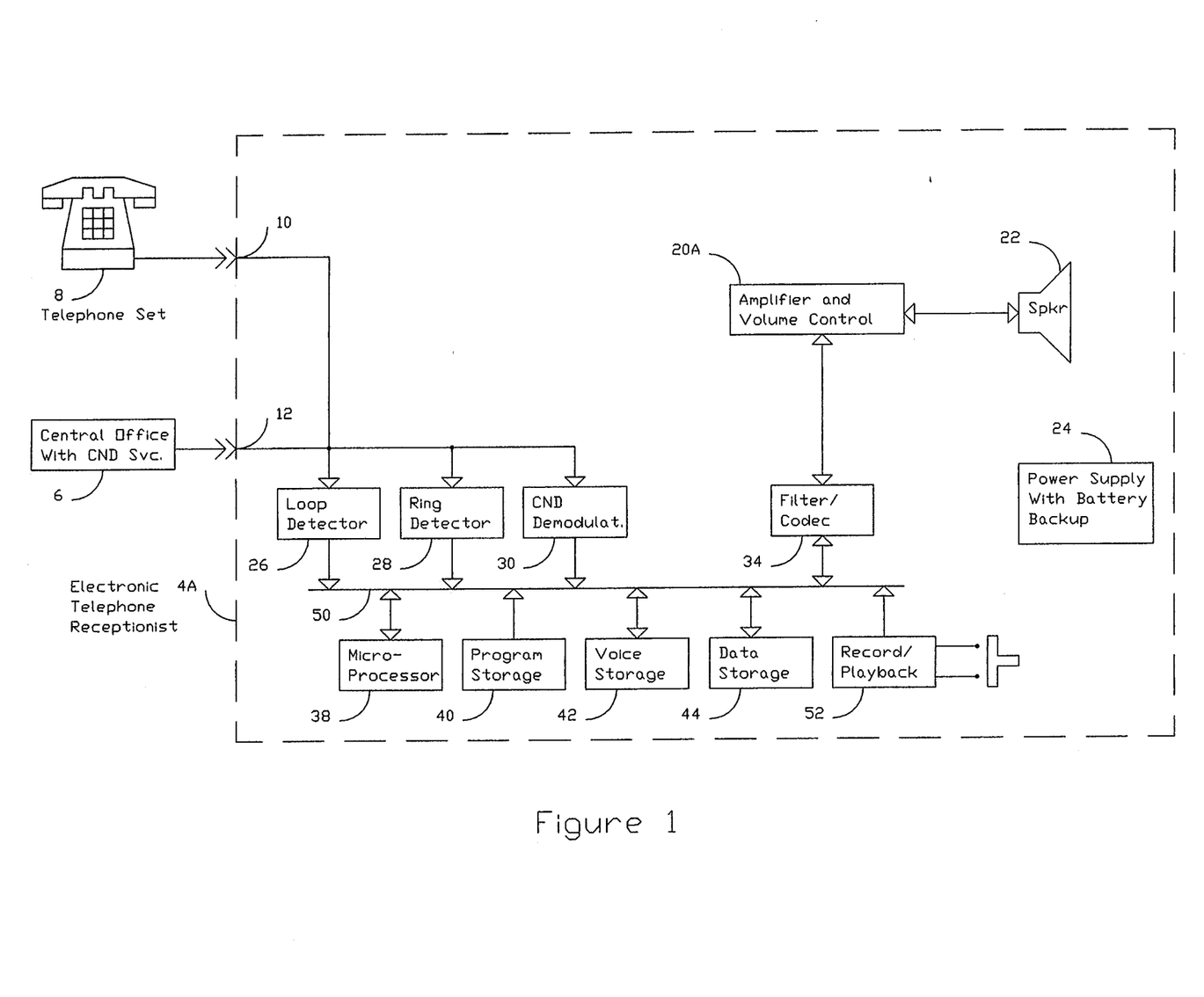
FIGS. 1 and 2 depict the components of two preferred embodiments of the present invention, an Electronic Telephone Receptionist (ETR), at the functional block level within the dashed outlines 4A and 4B. Embodiment 4A of FIG. 1 is in the form of a simple telephone call screening device. Embodiment 4B of FIG. 2 extends the functions of the telephone call screening device of FIG. 1 to include the functions of a novel telephone call logging and answering device. Also shown are an attached remote telephone central office facility 6 which is configured to provide Calling Number Delivery (CND) service, and an attached local standard analog telephone set 8.
Figure 2:
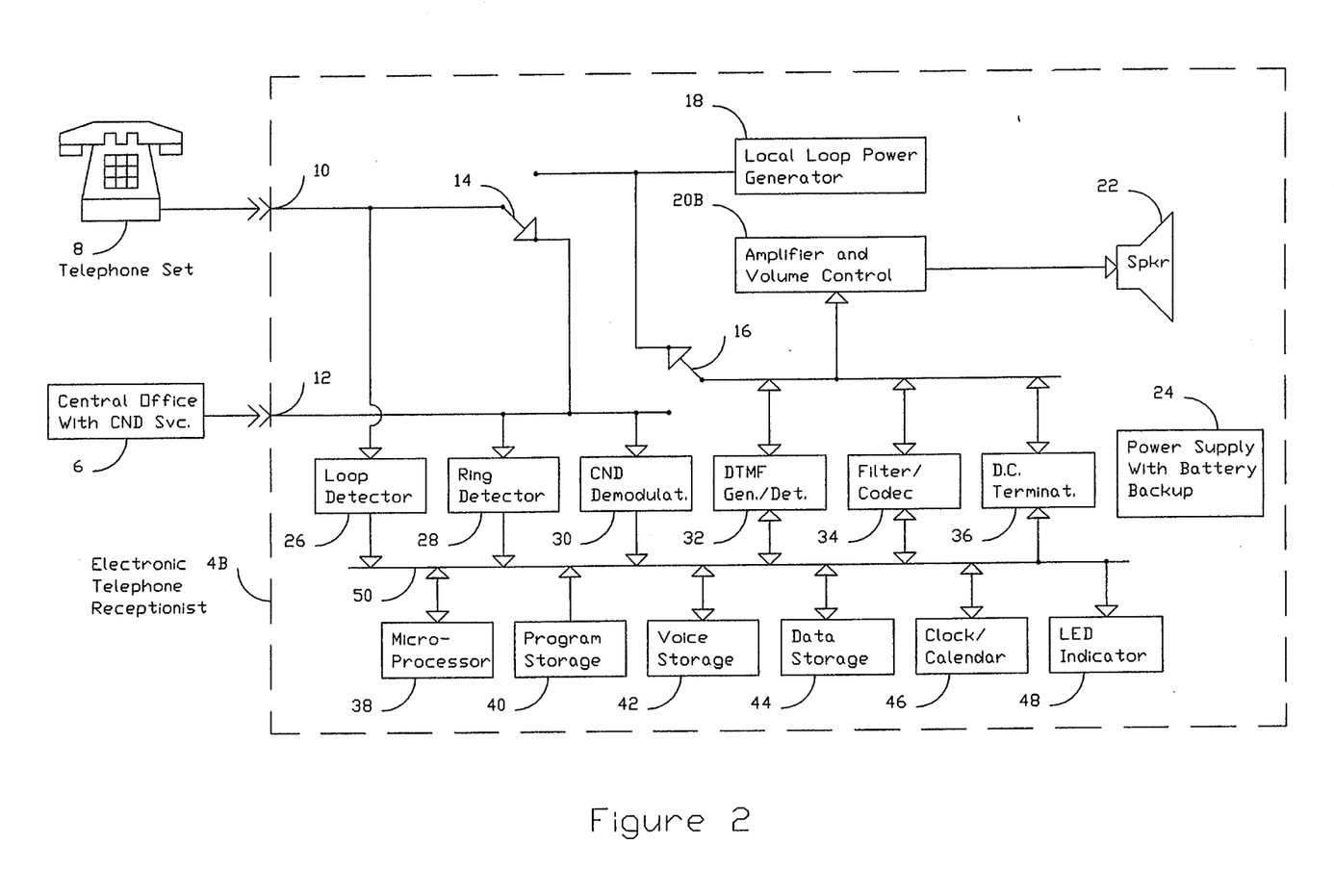

Two preferred embodiments of the Electronic Telephone Receptionist (ETR) are illustrated in the block diagrams of FIGS. 1 and 2. The first ETR embodiment 4A of FIG. 1 provides simple call screening functions only, while the second embodiment 4B of FIG. 2 provides call screening functions, and additionally provides call logging, answering, messaging, remote control, and other enhanced functions to be described. ETR embodiments 4A and 4B contain several elements in common. In the interests of brevity, such elements in common are described only once. Furthermore, reference to ETR 4 should be read as references to ETR 4A or ETR 4B equally. ETR 4 is typically situated within the user's residence or business premises. ETR 4 is connected by a modular line jack 12 and outside wiring to a serving telephone network central office 6 that has been arranged to provide Calling Number Delivery (CND)

service. ETR 4B is connected by a modular telephone jack 10 and standard inside wiring to one or a plurality of telephone sets 8. ETR 4A can, but need not necessarily, also be connected by modular telephone jack 10 and standard inside wiring to one or a plurality of telephone sets 8; in ETR 4A line jack 12 and telephone jack 10 are simply connected in parallel, with telephone jack 10 provided as a convenience to the installer.

The operation of ETR 4 is controlled by a microprocessor 38 through the execution of instructions contained in program storage 40. Address, control, and data bus 50 serves to connect microprocessor 38 with program storage 40, and other peripheral devices to be described. A loop state detector 26 provides microprocessor 38 with the ability to sense changes in the on-hook or off-hook state of telephone set(s) 8. A ringing voltage detector 28 provides microprocessor 38 with the ability to sense the presence or absence of ringing voltage application by central office 6. A demodulator 30 converts the frequency modulated CND information transmitted by central office 6 into a sequence of alphabetic and numeric characters recognizable by microprocessor 38. A filter, encoder, and decoder block (codec) 34 provides bidirectional conversion between analog voice frequency signals and sequences of digitally encoded samples of those signals. The codec can be implemented, for example, with commercially available integrated circuits used in the construction of digital telephone systems, and can include compression and expansion techniques in order to reduce voice storage requirements. Codec 34 of ETR 4B additionally includes a two wire to four wire conversion circuit (hybrid) for communication with central office 6 and telephone set 8. In an alternative embodiment, CND demodulator 30, which is typically implemented using a hardware demodulator circuit, can be eliminated, and demodulation performed in software by microprocessor 38 operating on digital samples of the frequency modulated signal encoded by the receive filter and encoder portions of codec 34. Voice storage 42, which may be, for example, semiconductor, magnetic, optical, or combinations thereof, retains digital representations of voice messages received from and transmitted to codec 34. A portion of voice storage 42 of ETR 4B is non-volatile, and holds prerecorded voice used to implement aspects of the user's interface. Alternative embodiments might employ analog, rather than digital means of recording and playing back voice, possibly reducing cost at the expense of access latency. A calendar/clock 46 provides microprocessor 38 with date and time information for time stamping purposes, and may be an inherent capability of certain microprocessors. Data storage 44 holds tabular data used to describe incoming calls and messages, outgoing messages, outgoing greetings, CND announcement messages, and reminder messages. Data storage 44 also stores housekeeping information such as allocation tables for voice storage 42, and current settings for controls such as security code, recording speed, maximum message time limit, answering machine on-off state, and alarm clock on-off state and time setting. Program storage 40, voice storage 42, and data storage 44 are shown as separate functional blocks for clarity; in practice, however, a single physical storage medium and device, flash or EEPROM memory for example, could easily be used to accommodate all three functions.

A phone control relay 14 of ETR 4B, when deenergized, places the attached telephone(s) 8 on line to central office 6, and when energized by microprocessor 38, connects telephone set(s) 8 to a local loop power generator block 18 that supplies power for off line telephone operations. Line control relay 16 of ETR 4B, also controlled by microprocessor 38, when deenergized, disconnects dual tone multiple frequency (DTMF) generator and detector 32 and codec 34 from central office 6, and connects them to local loop circuit 18. When energized by microprocessor 38, line control relay 16 disconnects DTMF generator and detector 32 and codec 34 from local loop circuit 18, and connects them to central office 6. Loop termination 36 of ETR 4B, also controlled by microprocessor 38, places a direct current load across the tip and ring pair when activated to provide signaling to central office 6. It can be used to originate, answer, and clear central office calls. DTMF generator and detector 32 can be also be used to provide signaling to central office 6, as well as to receive signaling from central office 6 and attached telephone set(s) 8. Duplex audio amplifier and volume control 20A and speaker 22 of ETR 4A, can be configured by microprocessor 38 to provide either audio input to the encoder, in which case speaker 22 is used as a microphone, or to provide audio output from the decoder of codec 34, in which case speaker 22 is used conventionally. Clearly separate microphone and speaker circuits could be used. Simplex audio amplifier and volume control 20B drive speaker 22 of ETR 4B with the combined transmitted and received signals present on the analog sides of DTMF generator and detector 32 and codec 34. A power supply circuit 24 provides normal operating power from household current, and, if necessary, provides standby power from batteries in order to retain voice storage 42 and data storage 44 contents during household power interruptions. A light emitting diode (LED) 48 is controlled by microprocessor 38, and used as a visual status indicator; for example to indicate the number of pending incoming messages. Record/playback switch 52 is read by microprocessor 38 to detect user requests for service.

Operation

Operation of the two ETR embodiments 4A, a telephone call screening device, and 4B, a telephone call screening and answering device are significantly different, and are therefore described separately. In the operations of each embodiment, several exceptional conditions can arise. However, exceptional conditions and their treatments are generally not crucial to the objects and advantages that are specified, and in the interests of clarity and brevity are therefore not described.

Operation of the First Embodiment

Operation of the first ETR embodiment 4A of FIG. 1 is controlled by microprocessor 38 and the instructions in program storage 40. Upon application of primary power, a reset signal is generated which forces microprocessor 38 to execute a self test and initialization procedure. The initialization sequence consists of an examination of a file in data storage 44 containing records in which are stored the Calling Number fields of information messages previously received from central office 6 paired with pointers to announcements in voice storage 42 previously recorded by the user to announce calls. Records in this file are appended with checksums when created, and are deleted during initialization if checksums are found in error. Records having valid checksums and having associated recorded announcements in voice storage 42 are processed to establish initial allocation maps of data storage 44 and voice storage 42. Areas of storage not allocated during this initialization process become candidates for subsequent allocation to new announcements.

Following initialization, microprocessor 38 enters an idle state in which it continuously examines ringing voltage detector 28. Immediately on detection of ringing, microprocessor 38 allocates a temporary record in data storage 44. Following the first ring, CND demodulator 28 receives the Calling Number information message from central office 6, and converts the information from its frequency modulated analog form to a sequence of characters in digital form. Typically this information includes the current month, day, hour, and minute, and the area code and directory number of the calling line. Microprocessor 38 copies the area code and directory number information from CND demodulator 28 to the temporary record allocated previously. The contents of all other valid records in data storage 44 are searched for a match with contents of the temporary record. If a matching record is found, a pointer to a user-recorded message in voice storage 42 is extracted from the matching record to announce the call. Digital samples from the selected recording are sequentially copied by microprocessor 38 from voice storage 42 to codec 34, where they are converted to analog levels and presented to audio amplifier 20A and speaker 22, thereby audibly announcing the call before it is answered. Alternative means of announcement will be obvious to one skilled in the art, including for example, an external amplifier and speaker system which could also be associated with an intercom or public address system.

Simultaneously with the playing of the selected announcement, microprocessor 38 monitors ring detector 28 and loop detector 26, testing for an off-hook condition, and repeating the announcement after each ring. If ringing stops without an off-hook indication, the incoming call is assumed unanswered. If an off-hook condition is detected, the incoming call is assumed answered, and microprocessor 38 continues monitoring loop detector 26 for an on-hook condition to indicate clearing of the call. In either case, if no user-recorded announcement was found during the previously described search, a short tone is generated by playing the digital representation of a sine wave through codec 34, amplifier 20A, and speaker 22 to signal the user that no announcement is on file for the previously received CN. The user can respond by pressing and holding Record/Playback switch 52, during which period microprocessor 38 configures speaker 22, amplifier 20A, and codec 34 as input devices, and stores digital samples of the user's spoken announcement message received from codec 34 into an available area of voice storage 42. The allocation map is updated, a pointer to the announcement is inserted into the previously allocated record containing the CND information, a checksum is calculated, and the record is made permanent. The idle state is then reselected. Notice that (a) an announcement is now available for playback on the next call from the received CN, (b) that it is not necessary for the user to key, otherwise supply, or even know the CN information, (c) that it is not necessary for the user to key the announcement information, and (d) that there are no pronunciation, language, intonation, or other significant constraints on the announcement's qualities.

Operation of the Second Embodiment

Initialization:

ETR 4B operations are controlled by microprocessor 38 and the instructions in program storage 40. Upon application of primary power, a reset signal is generated which forces microprocessor 38 to execute a self test and initialization procedure. Self test failures are reported by distinctive flashing sequences using LED 48. The initialization sequence consists of an examination of the files in data storage 44 containing a log of incoming calls, outgoing messages, greeting messages, CND announcements, reminder messages, and user control settings. Records in these files are appended with checksums when created, and are deleted during initialization if checksums are found in error. Records having valid checksums and having associated recorded messages in voice storage 42 are processed to establish an initial allocation map of voice storage 42 and data storage 44. Areas of storage not allocated during this initialization process become candidates for subsequent allocation. The number of incoming messages received and outgoing messages delivered which have not yet been acknowledged by the user is displayed as sequence of flashes at LED 48.

Following initialization, microprocessor 38 enters an idle state in which it continuously examines ringing voltage detector 28, loop state detector 26, and calendar/clock 46. If ringing is detected, incoming call processing is executed. If an off-hook condition is detected, outgoing call processing is executed. If the clock advances, timer processing is executed.

Incoming Call Processing:

Incoming call processing takes place in response to a signal from ringing voltage detector 28 to microprocessor 38 while in the idle state. Immediately on detection of ringing, an incoming call log record is allocated in data storage 44 and initialized with the date and time currently held in calendar/clock 46. Upon detection of the end of the first application of ringing voltage by central office 6, line control relay 16 is energized to connect codec 34 to the central office line 6. Codec 34 provides microprocessor 38 with digitized samples of the voltage levels being received from the central office. The sample rate exceeds twice the frequency of the 1,200/2,200 Hz CND signal to eliminate aliasing. Microprocessor 38 analyzes the digital samples to estimate zero-crossing times, and from these zero-crossing times, the time-varying frequencies of the received signal. From the time-varying frequencies of the received signal, microprocessor 38 classifies the signal into a sequence of zeros and ones in order to decode the Calling Number Delivery (CND) message contents. Line control relay 16 is deenergized upon completion of delivery of the CND message. In an alternative embodiment, a commercially available integrated circuit demodulator 30 could be used in place of the software demodulation procedure just described. The date and time field contents of the received CND message are used to update the contents of calendar clock circuit 46 and the incoming call record, thus keeping the ETR's clock synchronized with local time as supplied by central office 6. The calling line identification field contents of the received CND message are written to the incoming call record, and used to search an announcement file in data storage 44. If a matching entry is found, a pointer to a user-recorded message in voice storage 42 is extracted from the record to announce the call. If no match is found, a sequence of pointers to prerecorded sounds for each of the digits in the received calling line identification is constructed to announce the call. In either case, the selected digital recording is copied by microprocessor 38 from voice storage 42 to codec 34, where it is converted to analog levels and presented to audio amplifier 20B and speaker 22. The volume level is established by microprocessor 38 using a variable set by the user in a manner to be described later. Alternative means of announcement will be obvious to one skilled in the art, including for example, a manual volume control, or an external amplifier and speaker system which could also be associated with an intercom or public address system.

Simultaneously with the playing of the selected announcement, microprocessor 38 monitors ring detector 28 and loop detector 26, counting and timing rings, testing for an off-hook condition, and repeating the announcement after each ring.

If ringing stops without an off-hook indication, the incoming call log record is closed with a status of "unanswered," and the idle state is reselected.

If ringing stops with an off-hook indication, the incoming call log record is closed with a status of "answered manually." If an announcement was found during the previously described search, the idle state is reselected; otherwise the on-hook condition is awaited. When on-hook is detected, a tone is generated by passing a digital representation of a sine wave through codec 34, amplifier 20B, to speaker 22, and a timer is initialized. The purpose of the tone is to alert the user of the opportunity to record an announcement to be played when receiving calls from the same calling number in the future. Microprocessor 38 monitors loop state detector 26, ring detector 28, and its internal timer. If the timer expires or if ringing is detected, the idle state is reselected. If the user takes the phone off-hook, an announcement file record is allocated in data storage 44 and initialized with the CN data received with the previous call. Space is allocated in voice storage 42, and a pointer to the allocated voice storage is written into the announcement record. Phone control relay 14 is energized, and a prerecorded message is played back from voice storage 42 through codec 34 and onto the local loop to the user's telephone 8. The message prompts the user to record a short announcement for future calls from the CN just received, and to press any key when finished. As the user dictates the announcement, it is converted to a sequence of digital samples by codec 34, and written to voice storage 42 by microprocessor 38. Recording continues in this manner until DTMF detector 32 reports the presence of a tone, loop state detector 26 reports an on-hook condition, or the allocated voice storage is filled, whichever occurs first. Microprocessor 38 then deenergizes phone control relay 14, closes the announcement record, and the idle state is reselected. Notice that as in the case of the first embodiment, (a) an announcement is now available for playback on the next call from the received CN, (b) that it is not necessary for the user to key, otherwise supply, or even know the CN information, (c) that it is not necessary for the user to key the announcement information, and (d) that there are no pronunciation, language, intonation, or other significant constraints on the announcement's qualities.

If the call is not answered manually, and if ringing continues until a predetermined threshold count is reached, and if the ETR's answering machine function is enabled, microprocessor 38 energizes line control relay 16 to connect central office 6 with codec 34 and DTMF detector 32. Loop termination 36 is also energized, signaling central office 6 that the incoming call has been answered. The incoming call log record is marked with a status of "answered automatically" (that is, answered by the ETR). Microprocessor 38 then searches a file of outgoing messages in data storage 44 for records which match the received CN. Each record in which a matching CN is found contains a pointer to a user-recorded message in voice storage 42. Microprocessor 38 uses these pointers to transfer the digitally recorded message samples from voice storage 42 to codec 34, which in turn reconstructs the original analog signal and transmits it to central office 6 for retransmission to the calling party. Microprocessor 38 then uses date and time information stored in the matching record to select prerecorded speech in voice storage 42 to tell the caller when the outgoing message was prepared. Each record in data storage 44, and its associated voice storage 42, is released for reuse following playback, and the incoming call log record is marked to indicate that an outgoing message(s) was delivered during the call. Following outgoing message delivery, or immediately after answering the call if no matching outgoing message is pending, microprocessor 38 determines whether sufficient voice storage 42 is available for incoming messages. If not, a prerecorded message is played to the caller stating that messages cannot be taken at the present time, and the caller is prompted to enter a number if he would like his call returned. If a telephone number is recognized by DTMF detector 32, it is stored in the incoming call log record by microprocessor 38, and the record is closed with an indication that a return call has been requested. However, if sufficient voice storage 42 is available for incoming messages, microprocessor 38 examines the outgoing greeting file in data storage 44. The outgoing greeting file contains two records; the first can describe a user-recorded "temporary" greeting, and the second can describe a user-recorded "standard" greeting. If a temporary greeting exists, it is selected. If no temporary greeting exists, but a standard greeting does exist, the standard greeting is selected. If neither user-recorded greeting exists, a default prerecorded greeting is selected. Microprocessor 38 transfers the selected greeting from voice storage 42 to codec 34, which in turn reconstructs the original analog signal and transmits it to central office 6 for retransmission to the calling party. In order to record an incoming message, codec 34 filters and samples the incoming analog signal, converts the samples to digital format, and may apply compression techniques to reduce the required storage capacity before the speech is written to voice storage 42 by microprocessor 38. Throughout the period of playing any outgoing messages, playing the greeting message, and recording the incoming message, microprocessor 38 also monitors loop detector 26 to allow the user to interrupt processing and handle the call manually, and also monitors DTMF detector 32 for remote signaling. If the call is taken manually, any voice storage 42 that has been used is released to the available pool, and the incoming call log record is closed with a status of "manually answered." Two DTMF signaling sequences are recognized during incoming call processing; the first is a remote access code, which is used to activate the voice menu system, described later, and the second is a directory number, which is used to initiate a second search for outgoing messages. At the conclusion of all incoming call processing sequences, the incoming call log record in data storage 44 is closed by calculating and appending a checksum. Microprocessor 38 then terminates the call by releasing loop termination 36 and deenergizing loop control relay 16.

Outgoing Call Processing:

Outgoing call processing takes place in response to a signal from loop state detector 26 to microprocessor 38 while in the idle state indicating that the user has taken telephone set 8 off-hook. Microprocessor 38 then closes line control relay 16 and monitors DTMF detector 32 and loop detector 26. If a DTMF signal is detected, it is assumed that the user is initiating a normal telephone call through central office 6. In this case line control relay 16 is released, and loop detector 26 is monitored for the on-hook state, indicating clearing of the call, at which time the idle state is reselected. If, prior to detection of a DTMF signal, a hook flash signal is detected, it is assumed that the user wishes to activate the voice menu system, described later. In this case, microprocessor 38 energizes phone control relay 14 to power telephone 8 with local loop generator 18 and releases line control relay 16. In this configuration, the ETR 4B and telephone 8 can communicate with each other, while both appear on-hook to central office 6. Voice Menu System processing, described later, is then executed by microprocessor 38, which simultaneously monitors ring detector 28 for an incoming call. An incoming call detected while executing the voice menu system will preempt the voice menu system, and invoke the incoming call processing described previously.

Voice Menu System Processing:

Voice menu system processing takes place in response to the reception from a remote telephone of a DTMF signal sequence matching a predefined security code sequence during incoming call processing. Voice menu system processing also takes place in response to detection of a hook flash signal from a local telephone during outgoing call processing. In general terms, the voice menu system allows the user to direct the execution of microprocessor 38 by selecting with DTMF signals from lists of choices. The choices are presented by playing prerecorded spoken prompts. These prompts are resident in voice storage 42, and are played when microprocessor 38 transfers the prompts to codec 34, which converts the stored digital samples to analog signals. DTMF response signals are recognized by DTMF detector 32, and presented to microprocessor 38, which selects from among alternative program execution paths as a function of the received DTMF response signals. This forms a sufficient basis for a user interface to direct the execution of microprocessor 38 through the processing sequences which are described in the following paragraphs.

The Main Menu:

The main menu prompt offers the user access to the incoming call log file, the outgoing message file, the greeting message file, the call announcement file, the reminder file, and control adjustments. Access is attained with DTMF signals 1 through 6 respectively. DTMF signals 7 and 9 adjust volume control 20B down and up respectively from any menu. DTMF signal 8 toggles speaker 22 off and on from any menu. The DTMF * (asterisk) signal will generally move from lower level menus or functions upward toward the main menu.

Incoming Call Log Menus:

The incoming call menus allow the user to review and process records in the incoming call log file portion of data storage 44. The first level menu prompts the user to choose between reviewing only those calls for which an incoming message was left by the caller, or all incoming calls. The selection is made with DTMF signals 1 or 2 respectively, and the response is used by microprocessor 38 to select records for presentation. The incoming call file is processed in inverse chronological order, from the most recently received call backward in time toward the oldest call. The user can backspace or fast forward through the file with DTMF signals 1 or 3 respectively, or use the 2 signal to select the record currently being presented for additional processing. The following information is presented for each record, by playing prerecorded speech:

(a) The sequence number of the record (e.g., "Number 3").

(b) The date and time of the call (e.g., "Today, 8:45 AM").

(c) The message recorded by the user to announce calls from the CN field contents of the record (e.g., "It's Grandma"), if a matching announcement record exists.

(d) The CN field contents of the record (e.g., "555-1212").

(e) The disposition of the call (e.g., "Answered manually", "Not answered", or "Answered by me").

(f) For automatically answered calls (i.e., "Answered by me"), the caller's message, if one was left, or "No message was left" if not, or "Message erased" if a message was left, but subsequently erased by the user, or "Callback was requested" if no voice storage 42 was available at the time of the call, and the caller requested that his call be returned.

Each record of a call for which an incoming message is available is automatically selected by microprocessor 38 for additional processing. The first step of this processing prompts the user to erase the message ("Press 5 to erase message, 6 to save it.") If the user elects to erase the message, the area of voice storage 42 used to record the message is released for reuse, and the incoming call record is marked with an indication that a message was taken and subsequently erased. The remaining additional processing is common both to records selected automatically because of an attached incoming message, and to records selected by the user with the DTMF 2 signal during review. If no announcement is on file which matches the CN field of the call record, the user is prompted to "Press 5 to record an announcement for future calls from this number." The user can add a record to the announcement file in this manner without having to key the CN, which is copied by microprocessor 38 from the incoming call record to the newly allocated announcement record. The user is next prompted to "Press 4 to dial caller's number, 5 to dictate a reminder, 6 to dictate an outgoing reply."

If the user responds with the DTMF 4 signal to initiate a call, microprocessor 38 energizes line control relay 16 and loop termination 36. This establishes a connection between DTMF generator 32 and central office 6, and signals central office 6 that a call is being originated. Microprocessor 38 then copies the CN information from the selected incoming call log record to DTMF generator 32 to dial the caller's number. Microprocessor 38 then deenergizes phone control relay 14 to connect the user's phone 8 to central office 6, and deenergizes line control relay 16 and loop termination 36 to disconnect ETR 4B from the call.

If the user responds with the DTMF 5 signal to dictate a reminder, microprocessor 38 allocates a record in the reminder file of data storage 44, allocates an area of voice storage 42 to hold the reminder, and initializes the record with a pointer to the voice storage, and a status of unscheduled. The user is prompted to "Press 1 to record a scheduled reminder, 2 to record an unscheduled reminder." If a scheduled reminder is selected, the user is prompted to supply the month, day, hour, and minute with DTMF signals, this information is added to the record, and the record status is changed to scheduled. In either case, the user is prompted to record the reminder, and to press any key to signal completion. Microprocessor 38 copies digital samples of the message from codec 34 to the allocated area of voice storage 42 until the recording is complete.

If the user responds with the DTMF 6 signal to dictate an outgoing reply message, microprocessor 38 allocates a record in the outgoing message file of data storage 44, allocates an area of voice storage 42 to hold the reply, and initializes the record with a pointer to the voice storage, a copy of the CN information from the selected incoming call record, and the current date and time from calendar clock 46. The user is prompted to record the message, and to press any key to signal completion. Microprocessor 38 copies digital samples of the message from codec 34 to the allocated area of voice storage 42 until the recording is complete. Note that the user is not required to supply the addressee's directory number when preparing outgoing messages in this manner.

Outgoing Message Menus:

The outgoing message menus allow the user to review, add to, or delete from the file of messages awaiting delivery to incoming calls. The first level menu prompts the user to add a new message or play messages currently on file, by pressing 1 or 2, respectively.

If the DTMF 1 signal is received, microprocessor 38 allocates a record in the outgoing message file of data storage 44, allocates an area of voice storage 42 to hold the message, and initializes the record with a pointer to the voice storage, and the current date and time from calendar clock 46. The user is prompted to supply the addressee's calling number, which is copied from the DTMF detector to the record by microprocessor 38. The user is then prompted to record the message, and to press any key to signal completion. Microprocessor 38 copies digital samples of the message from codec 34 to the allocated area of voice storage 42 until the recording is complete.

If the DTMF 2 signal is received, the outgoing message file is processed in inverse chronological order, from the most recently recorded message backward in time toward the oldest message. The user can backspace or fast forward through the file with DTMF signals 1 or 3 respectively, or use the 2 signal to select the record currently being presented for additional processing. The following information is presented for each record, using prerecorded speech:

(a) The sequence number of the record (e.g., "Number 3").
  (b) The date and time the message was prepared (e.g., "Yesterday, 8:25 PM").
  (c) The message recorded by the user to announce calls from the CN field contents of the record (e.g., "It's Grandma"), if a matching announcement record exists.
  (d) The CN field contents of the record (e.g., "555-1212").

If the user selects a record for additional processing with the DTMF 2 signal, he is prompted to "Press 4 to dial caller's number, 5 to replace message, 6 to erase." If 4 is pressed, microprocessor 38 initiates an outgoing call using the same means described previously under the title Incoming Call Log Menus. If 5 is received, the user is prompted to record a new message and signal completion by pressing any key. The means of outgoing message recording described previously is employed to overwrite the contents of the allocated voice storage 42, and the record's date and time field are overwritten with the current contents of calendar/clock 46. If 6 is received, the allocated voice storage 42 and the selected record are released for reuse.

Outgoing Greeting Menu:

The outgoing greeting menu allows the user to play, delete, or record temporary and standard outgoing greeting messages. Two records, one for each of these greeting messages, are statically allocated in data storage 44, each with a pointer to a greeting message in voice storage 42 if a message has been recorded, or a null pointer otherwise.

For each record, if a greeting exists (non-null pointer), it is played. Then the user is given the opportunity to erase existing greetings or to record non-existing greetings. To erase an existing greeting, microprocessor 38 releases the associated voice storage 42 for reuse, and sets the corresponding record's pointer to the null value. To record a greeting, microprocessor 38 uses means previously described for other recordings, and sets the corresponding record's pointer to the address of the newly allocated voice storage 42.

Call Announcement Menus:

The call announcement menus allow the user to add to or review the file of incoming call announcements. The first level menu prompts the user to add a new announcement or play announcements currently on file, by pressing 1 or 2, respectively.

If the DTMF 1 signal is received, microprocessor 38 allocates a record in the announcement file of data storage 44, allocates an area of voice storage 42 to hold the announcement, and initializes the record with a pointer to the voice storage. The user is prompted to supply the calling number, which is copied from the DTMF detector to the record by microprocessor 38. The user is then prompted to record the announcement, and to press any key to signal completion. Microprocessor 38 copies digital samples of the message from codec 34 to the allocated area of voice storage 42 until the recording is complete.

If the DTMF 2 signal is received, the call announcement file is processed in inverse chronological order, from the most recently recorded announcement backward in time toward the oldest announcement. The user can backspace or fast forward through the file with DTMF signals 1 or 3 respectively, or use the 2 signal to select the record currently being presented for additional processing. The following information is presented for each record, using prerecorded speech:

(a) The sequence number of the record (e.g., "Number 3").
  (b) The announcement recorded by the user (e.g., "It's Mary").
  (c) The calling number associated with the announcement (e.g., "555-1212").

If the user selects a record for additional processing with the DTMF 2 signal, he is prompted to "Press 4 to dial caller's number, 5 to replace announcement, 6 to erase." If 4 is received, microprocessor 38 initiates an outgoing call using the means described previously under the title Incoming Call Log Menus. If 5 is received, the user is prompted to record a new announcement and signal completion by pressing any key. The means of message recording described previously is employed to overwrite the contents of the allocated voice storage 42. If 6 is received, the allocated voice storage 42 and the selected record are released for reuse.

Reminder Menus:

The reminder menus allow the user to add to or review the file of reminder messages, or "memos." The first level menu prompts the user to add a new reminder or to play reminders currently on file, by pressing 1 or 2, respectively.

If the DTMF 1 signal is received, microprocessor 38 allocates a record in the reminder file of data storage 44, allocates an area of voice storage 42 to hold the reminder, and initializes the record with a pointer to the voice storage, and a status of unscheduled. The user is prompted to "Press 1 to record a scheduled reminder, 2 to record an unscheduled reminder." If a scheduled reminder is selected, the user is prompted to supply the month, day, hour, and minute with DTMF signals, this information is added to the record, and the record status is changed to scheduled. In either case, the user is prompted to record the reminder, and to press any key to signal completion. Microprocessor 38 copies digital samples of the message from codec 34 to the allocated area of voice storage 42 until the recording is complete.

If the DTMF 2 signal is received, the reminder file is processed. Unscheduled reminders are processed first, in the order in which they were added, followed by scheduled reminders in chronological order of expiration date and time. The user can backspace or fast forward through the file with DTMF signals 1 or 3 respectively, or use the 2 signal to select the record currently being presented for additional processing. The following information is presented for each record, using prerecorded speech:

(a) The sequence number of the record (e.g., "Number 3").
(b) If it is a scheduled reminder, the expiration date and time of the reminder (e.g., "Monday, May 17th, 2 PM").
(c) The reminder message recorded by the user.

If the user selects a record for additional processing with the DTMF 2 signal, or if a scheduled reminder record is automatically selected by microprocessor 38 because its expiration date has passed, the user is prompted to "Press 5 to erase last message, 6 to save it." If 5 is received, the allocated voice storage 42 and the selected record are released for reuse. In either case, playback continues with the next reminder.

Control Adjustment Menus:

The control adjustment menus allow the user to check and adjust the setting of the ETR's controls. If this option is selected from the Main Menu, the user hears, "Answering machine is on (or off). Press 1 to turn it off (or on), 2 to set alarm clock, 3 to check storage, 4 to set ring counter, 5 to set security code or phone number, 6 to set time or date."

If the DTMF 1 signal is received, the state of the answering machine on/off switch is toggled, and the menu is repeated to reflect the new state. When the answering machine switch is off, the ETR will not answer incoming calls unless a remote turn on procedure is followed. The ETR can be turned on remotely by placing three successive calls to the ETR, each within one minute of the previous call. If the number of rings of the first and second calls equal the value of the first and second digits of the security code, the ETR will turn the answering machine switch on and answer the third call on the first ring.

If the DTMF 2 signal is received, the user hears, "Alarm clock is on (or off), press 1 to turn it off (or on). It is set for <hour:minute AM/PM>. Press 2 to set time." The on/off state of the ETR's alarm clock feature is toggled if the 1 signal is received. If the 2 signal is received, the user is prompted to enter the four digit time, and to enter A for AM or P for PM.

If the DTMF 3 signal is received, the user hears,
"Incoming message limit is <nn> seconds.
Press 1 to decrease, 2 to increase.
Recording speed is fast (or slow).
Press 3 for slow (or fast).
<nn> minutes of storage available for new messages.
<nn> minutes contain incoming messages.
<nn> minutes contain outgoing messages.
<nn> minutes contain greetings.
<nn> minutes contain caller IDs.
<nn> minutes contain reminders.

This menu is used to shorten or lengthen the amount of time allowed for a single incoming message, and to select the recording speed. A faster recording speed uses a higher sampling rate and a higher cutoff frequency in codec 34 to obtain better recorded voice quality, at the expense of more rapid use of voice storage capacity 42. A slower recording speed, on the other hand, conserves voice storage capacity at the expense of voice quality by using a lower cutoff frequency and a lower sampling rate.

If the DTMF 4 signal is received, the user hears, "<n> rings. Press 1 to decrease, 2 to increase." This menu is used to control the number of rings the ETR waits before answering incoming calls.

If the DTMF 5 signal is received, the user hears, "Security code is 0<nnnn>. Press 0 plus four non-zero digits to adjust. Phone number is (nnn) nnn-nnnn. Press 1 plus area code and number to adjust." This menu is used to establish the remote control code, and to identify the area code and directory number of the line to which the ETR is attached. The uses of the remote control code have been described previously; to provide remote access to the menu system, and to provide a remote turn-on for the ETR's answering machine feature. The area code is used to suppress the announcement of the area code portion of CN information for those cases in which the CN area code matches the ETR's own area code. The directory number is used to generate a portion of a default greeting message in the case where the user has recorded neither a temporary nor a standard greeting of his or her own. The default greeting is, "Hello. You have reached nnn-nnnn. Please leave your message after the tone," where <nnn-nnnn> is generated from the directory number.

If the DTMF 6 signal is received, the user hears, "Enter four digit month and day," followed by "Enter four digit hour and minute," and finally "Please spell the day of the week." This menu is used to initialize or adjust the contents of calendar/clock 46.

The values of essentially all of the controls described in this section are stored in data storage 44, which is protected by battery backup over primary power failures.

Timer Processing:

Timer processing is invoked from the idle state each time that the contents of calendar/clock 46 differ from the time of the previous invocation. Processing consists of incrementing the time of previous invocation by one minute, examining the alarm clock variables, the battery condition, and the reminder message file.

If the invocation time matches the time for which the alarm clock is set, and the alarm clock switch is on, an alarm clock expired flag (a location in data storage 44) is set; otherwise this flag is reset.

If the invocation time matches the time for which the alarm clock is set, the level of the battery in power supply 24 is checked. If the battery voltage is low, a low battery voltage flag (also a location in data storage 44) is set; otherwise this flag is reset.

If the invocation time and date matches the expiration time and date of a reminder message ("memo"), a pointer (also a location in data storage 44) is set to the address of the expired reminder message; otherwise this pointer is set to a null value.

If either of the alarm clock expired or low battery voltage flags are set, or if the expired reminder pointer in non-null, microprocessor 38 causes a sequence of tones to be played using codec 34, amplifier and volume control 20B, and speaker 22 as described previously. The volume control is initially low, and gradually increased until either a period of several minutes has passed, or the user acknowledges the alarm condition by taking telephone 8 off-hook. If the user acknowledges the alarm, microprocessor 38 selects and plays appropriate message(s) from voice storage 42. If the alarm clock expired flag is set, the date and time are played. If the low battery voltage flag is set, a message warning the user to replace the batteries soon is played. If the expired reminder flag is non-null, the expired reminder is played.

Summary, Ramifications, and Scope

Accordingly, the reader will see that the Electronic Telephone Receptionist provides substantial improvements over prior art telephone call screening and answering devices. Among these, the ability to announce callers in the user's voice before calls are answered, the ability to record these call announcements locally and remotely without having to manually key or otherwise supply the associated calling numbers, the ability to record these call announcements verbally rather than by manually keying them, the accumulation of incoming call information in a manner that provides a convenient means of dictating outgoing reply messages for automatic delivery, of automatically returning calls while reviewing incoming calls, and of selectively erasing or retaining incoming messages, the ability to sound an alarm at a specifiable time, and to record timed reminders which automatically alarm and play back at specifiable dates and times.

Although the descriptions above contain many specificities, these should not be construed as limiting the scope of our invention, but of merely providing illustrations of preferred embodiments of the invention. For example, the functions of external telephone set 8 can readily be integrated with the ETR to combine the two devices into a single package. A second example is the extension of ETR embodiment 4A to include recording the CND information for a plurality of most recently received calls, and audibly replaying this information in response to user requests from Record/Playback switch 52. A third example is the elimination of Record/Playback switch 52 from ETR 4A by assuming that an announcement is being recorded if, following the prompt tone, speech energy above a predetermined threshold is received through duplex amplifier 20A and codec 34 and detected by microprocessor 38.

Thus the scope of the invention should be determined by the appended claims and their legal equivalents, rather than by the examples given.

We claim:

1. A telephone call screening device comprising:
   a. telephone line attachment means for receiving calls in a network delivering calling numbers to called lines,
   b. audio input means for receiving spoken messages,
   c. audio output means for reproducing said spoken messages,
   d. storage means for retaining a plurality of said delivered calling numbers and said spoken messages associated as pairs,
   e. search means for indicating equivalence or nonequivalence between each newly delivered calling number and any among said plurality of delivered calling numbers then retained by said storage means,
   f. recording/playing means for automatically prompting for spoken messages and transferring from said audio input means to said storage means as pairs, said spoken messages thus prompted and said delivered calling numbers following calls for which said search means indicates nonequivalence with any said calling number then retained, and playback means for automatically retrieving from said storage means and presenting to said audio output means said spoken messages associated with said delivered calling numbers then retained upon receipt of calls for which said search means indicates equivalence, whereby the identities of parties associated with said delivered calling numbers are announced by said spoken messages before calls are answered.

2. The telephone call screening device of claim 1 further including telephone set attachment means for using a locally attached telephone set as a signaling means and as an embodiment of said audio input means and said audio output means, and arranged to also provide telephonic communication when using said attached telephone set with said telephone line attachment means.

3. The telephone call screening device of claim 1 further including signaling means arranged to provide telephonic communication when used in conjunction with said audio input means, said audio output means, and said telephone line attachment means.

4. The telephone call screening device of claim 1 further including signaling means, greeting message recording and playback means, and incoming message recording and playback means arranged to provide telephone answering device functions when used together with said telephone line attachment means, said audio output means, and said storage means.

5. The telephone call answering device of claim 4 further including remote control means whereby telephone sets of calling parties serve as embodiments of said audio input means and said audio output means whereby remote access and control are provided.

6. The telephone call answering device of claim 4 further including means for prompting, receiving, and recording a telephone number to which a return call should be made in the case that the remaining capacity of said storage means is less than a predetermined value.

7. The telephone call answering device of claim 4 further including outgoing message recording means for indicating that certain among said spoken messages and delivered calling number pairs are stored for transmission to, rather than for the announcement of, incoming calls.

8. The telephone call answering device of claim 7 further including first outgoing message delivery means for, after answering a call, playing back over said telephone line attachment means such of said outgoing messages as have said paired delivered calling numbers that are equivalent to said delivered calling number of said answered call.

9. The telephone call answering device of claim 7 further including second outgoing message delivery means for, after answering a call, playing back over said telephone line attachment means such of said outgoing messages as have said paired delivered calling numbers that are equivalent to sequences of dual tone multiple frequency signals received during said answered incoming call.

10. The telephone call answering device of claim 9 further including incoming call logging means recording for each of a plurality of incoming calls said delivered calling number, the time and date of said calls, an indication of the disposition of said calls selected from the group consisting of not answered, answered manually, and answered by the device of claim 9 itself, an indication of whether said outgoing message delivery took place, an incoming message if one was left by the caller, or, if incoming message storage was unavailable, an indication of whether the caller requested that his or her call be returned, and if so, the number to which it should be returned.

11. The telephone call answering device of claim 10 further including means for playing back the contents of said incoming call log locally using said audio output means, and if found by said search means, playing back said spoken announcement messages that are paired with said delivered calling numbers.

12. The telephone call answering device of claim 11 further including first means for automatically placing calls for the user by dialing numbers previously received as said delivered calling numbers.

13. The telephone call answering device of claim 11 further including second means for automatically placing calls for the user by dialing numbers previously received from callers as said sequences of dual tone multiple frequency signals.

14. The telephone call answering device of claim 10 further including means for playing back the contents of said incoming call log remotely using caller's telephone for said audio output means, and if found by said search means, playing back said spoken announcement messages that are paired with said delivered calling numbers.

15. The telephone call answering device of claim 4 further including clock means for alerting the user using said audio output means that the current value of said clock means is equal to a value previously supplied by the user as an alarm expiration time by using said signaling means.

16. The telephone call answering device of claim 15 further including reminder message recording means for retaining in said storage means a plurality of said spoken messages together with a plurality of said alarm expiration times as pairs.

17. The telephone call answering device of claim 16 further including reminder message playback means for retrieving from said storage means to said audio output means each said reminder message at such time as the value of said reminder message's said paired alarm expiration time is equal to the value of said clock means.

18. A method for announcing the identities of calling parties to called parties before calls are answered comprising the steps of:
   a. comparing the calling party number delivered when a call is offered against a plurality of calling party numbers retained from previously offered calls,
   b. in case no match is found to exist, retaining said delivered calling number, and soliciting for and also retaining an associated announcement identifying the calling party, and
   c. in case a match is found to exist, retrieving and playing said calling party identifying announcement associated with said matching calling number previously delivered and retained, whereby the identities of calling parties are announced before calls are answered.

* * * * *